(12) United States Patent
Imhof

(10) Patent No.: US 8,505,869 B2
(45) Date of Patent: Aug. 13, 2013

(54) SUPPORT FRAME FOR ROBOTS

(75) Inventor: Peter Imhof, Tannheim (DE)

(73) Assignee: Multivac Sepp Haggenmueller GmbH & Co., KG (DE)

( * ) Notice: Subject to any disclaimer, the term of this patent is extended or adjusted under 35 U.S.C. 154(b) by 322 days.

(21) Appl. No.: 12/385,709

(22) Filed: Apr. 16, 2009

(65) Prior Publication Data
US 2009/0261230 A1    Oct. 22, 2009

(30) Foreign Application Priority Data

Apr. 18, 2008  (DE) .......................... 10 2008 019 710

(51) Int. Cl.
*F16M 1/00*    (2006.01)
(52) U.S. Cl.
USPC ............................. 248/637; 248/672; 901/50
(58) Field of Classification Search
USPC ............... 248/637, 639, 671, 672, 673, 676, 248/678, 300, 316.8, 174, 27.1, 317, 354.6, 248/645, 651, 646; 52/223.8, 223.9, 636, 52/649.8, 651.08, 654.1, 666, 671, 696, 318, 52/634, 665, 668, 667; 29/897.31, 521, 897.2; 14/74.5; 901/41, 50; 403/397
See application file for complete search history.

(56) References Cited

U.S. PATENT DOCUMENTS

| | | | | |
|---|---|---|---|---|
| 499,622 A * | 6/1893 | Weickel | ........................ | 212/312 |
| 1,113,868 A * | 10/1914 | Berson | ............................ | 52/667 |
| 1,931,118 A * | 10/1933 | Rowland | ........................ | 248/673 |
| 2,290,746 A * | 7/1942 | Gray | ................................ | 52/666 |
| 2,726,743 A * | 12/1955 | Short et al. | ...................... | 52/632 |
| 3,294,252 A * | 12/1966 | Tadashi Hosoi et al. | ..... | 212/312 |
| 4,417,426 A * | 11/1983 | Meng | ........................... | 52/126.7 |
| 4,428,136 A * | 1/1984 | Franklin | ......................... | 40/605 |
| 4,481,748 A * | 11/1984 | D'Alessio et al. | .............. | 52/638 |
| 4,630,740 A * | 12/1986 | Belokin, Jr. | .................... | 211/194 |
| 4,760,928 A * | 8/1988 | Bustos | ......................... | 211/59.4 |
| 4,820,101 A * | 4/1989 | Fenn | .............................. | 414/21 |
| 4,899,497 A * | 2/1990 | Madl, Jr. | ...................... | 52/126.6 |
| 5,335,386 A * | 8/1994 | Newell | ............................ | 14/74.5 |
| 5,392,902 A * | 2/1995 | Vlastakis | ....................... | 211/135 |
| 5,443,168 A * | 8/1995 | Dyment et al. | ............... | 211/149 |
| 5,519,978 A * | 5/1996 | Sucato et al. | ................ | 52/481.1 |
| 5,605,432 A * | 2/1997 | Fink et al. | .................. | 414/752.1 |
| 5,899,345 A * | 5/1999 | Fuller et al. | ................. | 211/132.1 |
| 5,946,867 A * | 9/1999 | Snider et al. | ................. | 52/167.1 |
| 6,059,169 A * | 5/2000 | Nihei et al. | ..................... | 228/45 |
| 6,119,875 A * | 9/2000 | Smith | .......................... | 211/59.1 |
| 6,193,086 B1 * | 2/2001 | Gunnlaugsson et al. | ..... | 212/290 |
| 6,302,283 B1 * | 10/2001 | Yeh | ................................ | 211/186 |
| 6,357,195 B1 * | 3/2002 | Chen | ............................... | 52/668 |
| 6,382,433 B1 * | 5/2002 | Podergois | ..................... | 211/195 |
| 6,382,437 B1 * | 5/2002 | Okada et al. | .................. | 212/274 |

(Continued)

FOREIGN PATENT DOCUMENTS

DE    10 2005 042 031 A1    3/2006
EP         1 886 924 A2       8/2007

*Primary Examiner* — Terrell McKinnon
*Assistant Examiner* — Eret McNichols
(74) *Attorney, Agent, or Firm* — Brooks Kushman P.C.

(57) ABSTRACT

The present invention relates to a support frame for a robot, in particular for use in applications for which hygiene is critical, for example in the handling of foods, medical equipment products, or pharmaceuticals, and/or packaging for same. According to the invention, the support frame is characterized in that it has an essentially open design which is closed, at the most, only in places.

20 Claims, 5 Drawing Sheets

(56) References Cited

U.S. PATENT DOCUMENTS

| | | | |
|---|---|---|---|
| 6,394,473 B1 * | 5/2002 | Platner | 280/124.1 |
| 6,446,817 B1 * | 9/2002 | Stitt | 211/41.12 |
| 6,634,155 B2 * | 10/2003 | Smith | 52/841 |
| 7,311,487 B1 * | 12/2007 | Crossley et al. | 414/331.06 |
| 7,905,365 B2 * | 3/2011 | Virvo | 211/73 |
| 8,281,529 B2 * | 10/2012 | Cluff | 52/271 |
| 8,281,540 B2 * | 10/2012 | Strickland et al. | 52/634 |
| 2002/0005022 A1 * | 1/2002 | Matthews | 52/483.1 |
| 2008/0245025 A1 * | 10/2008 | Slater et al. | 52/696 |
| 2009/0025343 A1 * | 1/2009 | Salm | 53/458 |
| 2009/0045156 A1 * | 2/2009 | Wierzba et al. | 212/324 |
| 2010/0101174 A1 * | 4/2010 | Orszulak et al. | 52/687 |

* cited by examiner

SUPPORT FRAME FOR ROBOTS

CROSS-REFERENCE TO RELATED APPLICATIONS

This application claims priority to German Patent Application No. 10 2008 019710.6 filed Apr. 18, 2008, which is herein incorporated by reference.

TECHNICAL FIELD

The present invention relates to a support frame for robots.

BACKGROUND

The use of robots is known for handling products, for example for packaging and/or for handling such packaging. To allow the robots to be positioned above a conveying path, for example, corresponding structural elements such as support frames are necessary. Since the handling of the products and/or their packaging sometimes proceeds at very high speeds, for example at well over 100 product transfers per minute, very high acceleration forces of up to 10 g (g=gravitational acceleration) and sometimes higher act on the support frame structure.

Additional loads on the support frame structure sometimes result from high weight forces from the products being handled, and for this reason the support frame must have the most stable design possible in order to keep vibrations as far away from the system as possible and thereby allow exact positioning of the gripping elements of the robot.

In order to achieve high mechanical stability for the support frame, it is customary in the trade to use profiled tubes in the construction of the support frame.

In particular in applications for which hygiene is critical, for example in the handling of foods, pharmaceuticals, or medical equipment products, and/or packaging for same, increasingly stringent hygiene requirements are imposed on the handling devices, for which adherence to the design of frame structures known heretofore is sometimes possible only with great difficulty.

SUMMARY

The object of the present invention, therefore, is to provide a support frame corresponding to the prior art described at the outset which better meets the increasingly stringent hygiene requirements.

Accordingly, a support frame according to the invention is characterized in that it is designed from an essentially open frame profile which is closed, at the most, only in places.

An open frame profile has the advantage that on the one hand cavities in the structure in which contaminants can collect are avoided, and on the other hand better accessibility of the support elements, in particular for cleaning and/or inspection purposes, is afforded due to the open design. In one preferred embodiment, the support frame according to the invention is characterized in that a side structure is provided which includes two adjacent side elements spaced at a distance from one another, at least in places. For the affected side of the support frame this results in a double support function, thus allowing the forces introduced into the support frame to be advantageously distributed over both side elements.

By providing connecting webs and/or connecting bars between these two side elements, the mechanical stability of the side elements may be greatly increased without the need for a closed profile. Such connecting webs or connecting bars may be composed, for example, of a relatively narrow, flat material such as a section of sheet metal, and are able to join the two side elements together at greater or smaller distances from one another, depending on the requirements for mechanical stability of the support frame. However, the support frame according to the invention may also have a completely open design at such connecting points, since up to the point of this connecting web the remainder of this support frame region is unobstructed and therefore easily accessible from its back side as well as from the regions of the front side adjoining the connecting web.

The connecting webs and/or connecting bars may be inserted into recesses in the side elements in a particularly advantageous manner, so that the design of the frame profile is essentially free of localized raised areas on the edges and/or surfaces. On the one hand this is beneficial with regard to reduced susceptibility to contamination, since in this manner no protruding edges or surfaces are provided on the support frame on which contaminants may deposit. On the other hand, there is also a beneficial effect with regard to cleaning, since applied cleaning fluid is able to easily run off the smooth surfaces and edges of the support frame.

The connecting webs and/or connecting bars may also have fastening elements, for example in the form of clips which are separated and bent away from the connecting webs and/or connecting bars, optionally with fastening holes and/or slots provided on the clips. However, in principle such fastening elements may also be provided in the side elements, optionally in a profiled grid, in order to provide various possibilities for positioning the robot and/or further components associated and/or cooperating with the robot.

Oblong slots may also be provided in the connecting webs which may be used either for improved cleaning and/or inspection or as a holding element for fixing additional machine components with variable positioning capability.

For further improvement in the mechanical strength while at the same time providing good inspection and/or cleaning characteristics using an open profile, the two side elements together with a connecting web may form a profile having a U- or C-shaped cross section, at least in places, preferably in a section which extends essentially vertically or inclined with respect to the horizontal.

In addition to the contours which are essentially free of localized raised areas, it is advantageous for the individual elements of the support frame themselves to have comparatively smooth surfaces, so that once again as little contamination as possible is able to deposit on the surfaces, and also cleaning fluid can easily run off. These advantageous hygienic characteristics may be further improved for the support frame according to the invention by providing all flat regions of the frame profile with a design that is inclined with respect to the horizontal or vertically oriented. In a particularly advantageous manner, even the edges of the individual frame elements may have similarly inclined surface areas.

A further improvement in the stability with simultaneous weight reduction may be imparted to the support frame according to the invention by providing truss-like braces and/or cutouts on various elements of the support frame, in particular on the side elements thereof.

In addition, with regard to stability and weight reduction of the support frame as well as for options for positioning a robot supported by the support frame, for example with regard to a transport device for the products to be handled, a gantry may advantageously be provided, in particular in the region of a side element. This allows the support frame to be placed above a conveying path from which the robot removes the products to be handled and deposits them at another location, or vice versa. These other locations may, for example, also be a corresponding conveying facility provided parallel to the first, for example, and/or a collecting point located, for example, at the end of or near one or more such conveying paths.

In addition, a longitudinal brace may advantageously be provided on a side element, for example in the region of the above-described gantry. In this manner, base-like frame elements provided on the gantry which improve the mechanical stability of the support may be connected to one another, optionally below a conveying plane for products to be handled by the robot. The longitudinal braces, the same as all the other elements, may be welded to the side elements, for example, preferably with a continuous weld seam, thus preventing formation of cavities in which contaminants could collect. However, the connection may also be designed as a screw connection, thus enabling better manipulation of the longitudinal braces, for example for installation and/or maintenance purposes.

Furthermore, the support frame may have a second side structure, as described above, which preferably is connected to the first side structure via transverse braces which preferably are likewise inclined with respect to the horizontal or vertically oriented. This allows a free-standing support frame structure to be achieved which has very good hygienic characteristics because of the open frame profile, but which still has very high mechanical stability as a result of the double side elements and the connecting webs or connecting bars joining them, as well as longitudinal braces and transverse braces, and, not least of all, the truss-like elements and the gantry element.

The transverse braces, the same as the connecting webs and/or connecting bars, may be situated in recesses provided in the side elements, thus likewise preferably allowing a smooth contour transition to the connecting point as described above. A further advantage of this arrangement of transverse braces inserted into the frame profile lies in a preferably flat surface thus achieved from which, at least in places, no elements protrude from the frame, thereby reducing risk of injury and also providing the possibility for attaching additional machine elements to the frame in as flat a manner as possible.

It may be particularly advantageous for such an additional equipment configuration, for example for providing a control cabinet or the like, when the transverse braces are situated between the side elements. In this manner fixing points on the side elements, for example, may basically be freely selected.

Exemplary embodiments of the invention are illustrated in the drawings and explained in greater detail below with reference to the accompanying figures.

DETAILED DESCRIPTION

Figure 1:
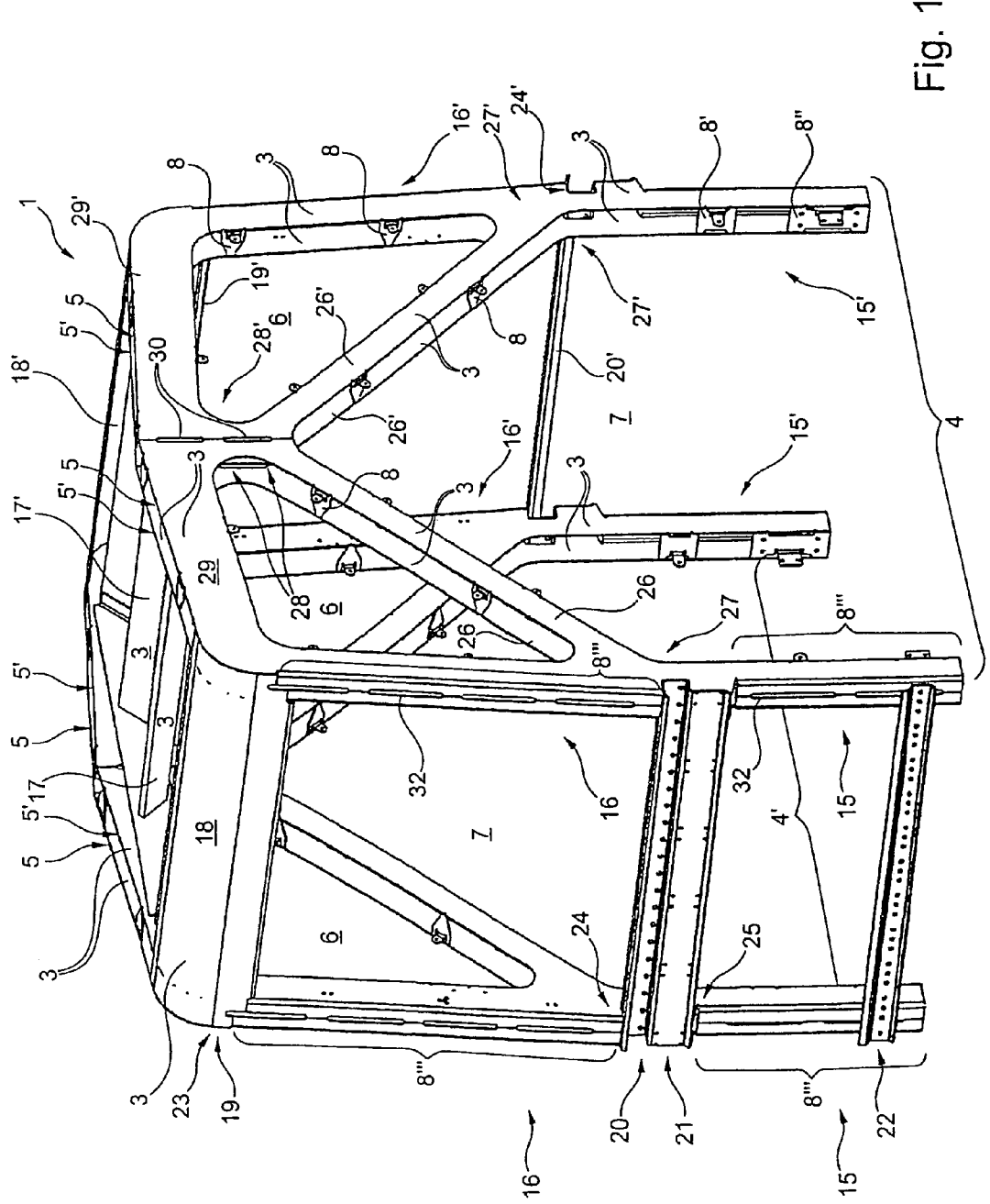
FIGS. 1 and 2 each show by way of example a perspective view of a support frame for a robot from different viewing angles and in different embodiments.

Accordingly, FIG. 1 shows a support frame 1 for a robot 2 (see FIGS. 4 and 5) which is provided in particular for use in applications for which hygiene is critical. This support frame is characterized in that it is formed from an essentially open frame profile 3. This open frame structure is achieved primarily by the fact that a side structure 4 of the support frame is composed of two adjacent side elements 5, 5' separated at a distance from one another, each having a flat design and comprising frame profile elements 3 oriented essentially only vertically and/or sharply inclined with respect to the horizontal.

To reduce the weight of the support frame and to improve its handling and operation characteristics, openings or cutouts 6, 7 are provided in the flat extension of the side elements 5, 5'. These openings or cutouts allow machine elements, such as for a conveying system or the like, to be led through the frame structure, thus enabling a robot mounted on the support frame to access the conveying system and products transported thereon.

For increasing the stability of the side structure 4, the two side elements 5, 5' may be partially joined together via connecting webs and/or connecting bars 8, 8', 8", 8''', and 8'''' in such a way that the frame profile is still accessible from all sides and thus maintains an open design.

Figure 3:
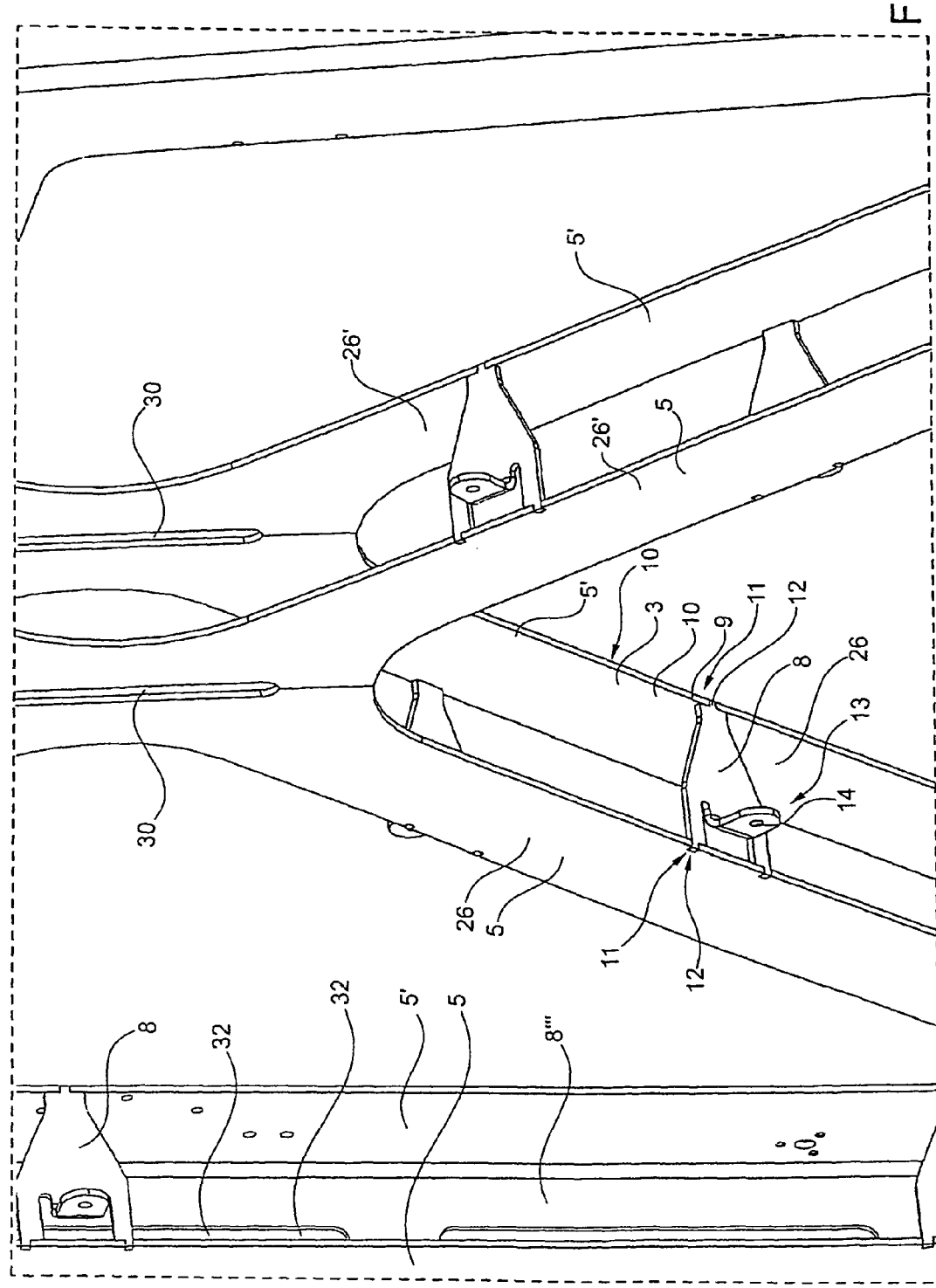
FIG. 3 shows an enlarged sectional illustration of a support frame corresponding to lines III in the viewing direction of arrow III in FIG. 2.

To allow a design of the frame profile which is essentially free of localized raised areas on edges 9 and surfaces 10, the connecting webs and/or connecting bars 8 may be inserted into corresponding recesses 11 in the side elements 5, for example by means of finger-like projections 12 (FIG. 3).

To provide the possibility for attaching machine elements to the support frame, corresponding fastening elements 13 may be provided on the machine elements. In the embodiment illustrated here, likewise in the sense of providing an essentially open frame profile, a clip 13 is cut out and bent down from the connecting web and/or connecting bar 8 in a wing-like manner and provided with an opening 14 for accommodating a further fixing element such as a screw or the like. In one possible embodiment, in the present case by way of example the connecting webs and/or connecting bars 8 have an approximately triangular contour with truncated or thickened corners, and at the side 2 having the fastening clip 13, projections 12 protruding in the manner of fingers are connected to the side element 5, and the opposite end has a separate connection to the side element 5. By means of this triangular connection between the two side elements 5, 5', the structural rigidity of the side structure 4, which as such is already increased due to the connection, may be further increased, in particular with respect to forces introduced at an angle, which may occur during acceleration of a robot arm, for example.

To allow the frame profile 3 to be reinforced even further, in the present embodiment illustrated by way of example the two side elements 5, 5' may be connected to a connecting web 8''' or 8'''' in such a way that they form a profile having a U- or C-shaped cross section. It is particularly advantageous to provide such a connection over a fairly long section of the frame profile. With regard to good hygiene suitability, the region of the support frame at which sections oriented vertically or inclined with respect to the horizontal are present, as is the case for base- or pillar-like elements 15, 16 of the support frame, for example, is particularly preferred.

In principle, it is advantageous for essentially all flat regions of the frame profile to be inclined with respect to the horizontal or vertically oriented, so that on the one hand the particularly preferred smooth surface that is provided, as well as the surfaces and associated edges, offer little opportunity from the outset for deposition of contaminants, and on the other hand light rinsing and subsequent runoff of cleaning fluid may be ensured. These also include in particular transverse braces 17 through 22, which for forming the support frame 1 connect a first side structure 4 to a second side structure 4' essentially parallel thereto.

In FIG. 1, in particular the transverse braces 19 through 22 are inserted at the end face into corresponding recesses in the side elements 5, 5' in such a way that essentially no region is provided which protrudes with respect to the outer contour. By welding with a continuous weld seam the transverse braces to the surfaces of the affected recesses in the two side elements 5, 5' associated with the transverse braces, it is possible on the one hand to ensure that no cavities are formed in which contaminants could collect, and on the other hand to achieve a further increase in the rigidity of the support frame while at the same time achieving advantageous hygienic characteristics due to the continued open design of the frame profile.

For further increasing the mechanical strength while simultaneously providing an open design of the profiled frame 3, according to the embodiment shown here as an example a truss-like brace 26 and/or a truss-like cutout 6, 7 may be provided on the side element 5. The truss-like braces which are essentially inclined with respect to the horizontal extend obliquely downward and outward, in this case as an example, from the center of the upper region of the side element 5 to a region of the support frame 1 which is essentially supported on top.

The associated connecting point 27 is preferably situated in a transition region between the base-like element 15 of the support frame 1 and the pillar-like upright section 16 which adjoins same at the top, preferably with a sharply inclined orientation. In this manner the truss-like cutouts or openings 6 may be provided essentially as approximate isosceles triangles with preferably rounded corners, thereby imparting high mechanical strength in the vertical as well as horizontal directions of the support frame. However, other geometric contours are also possible using braces 26 and the openings or cutouts 6, as well as the two base- and pillar-like elements 15 and 16 and the third leg of the head brace 29 which forms a triangle. This head brace 29 extends outwardly in the upper region, from the center of the side element 5 inclined with respect to the horizontal, to the pillar-like support element 16 of the support frame 1.

The head brace 29 as well as the truss-like brace 26 abut one another at the top and center of the support frame 1 at second elements having a complementary design in such a way that, in one preferred embodiment, the entire side element 5 is divided into two mirror-symmetrical halves. Openings preferably in the form of slots may be provided in the abutment region of these two halves which extends downward from the upper edge of the 5 over a fairly long section. These openings allow a further improvement in the hygienic characteristics of the support frame designed in this manner, so that on the one hand visible inspection is possible, and on the other hand cleaning agents, in particular cleaning fluids, may be introduced which in addition to liquids may include gaseous media and/or mixtures thereof. A further advantage lies in reduced distortion of the material on account of the reduced length of the weld seams.

Figure 4:
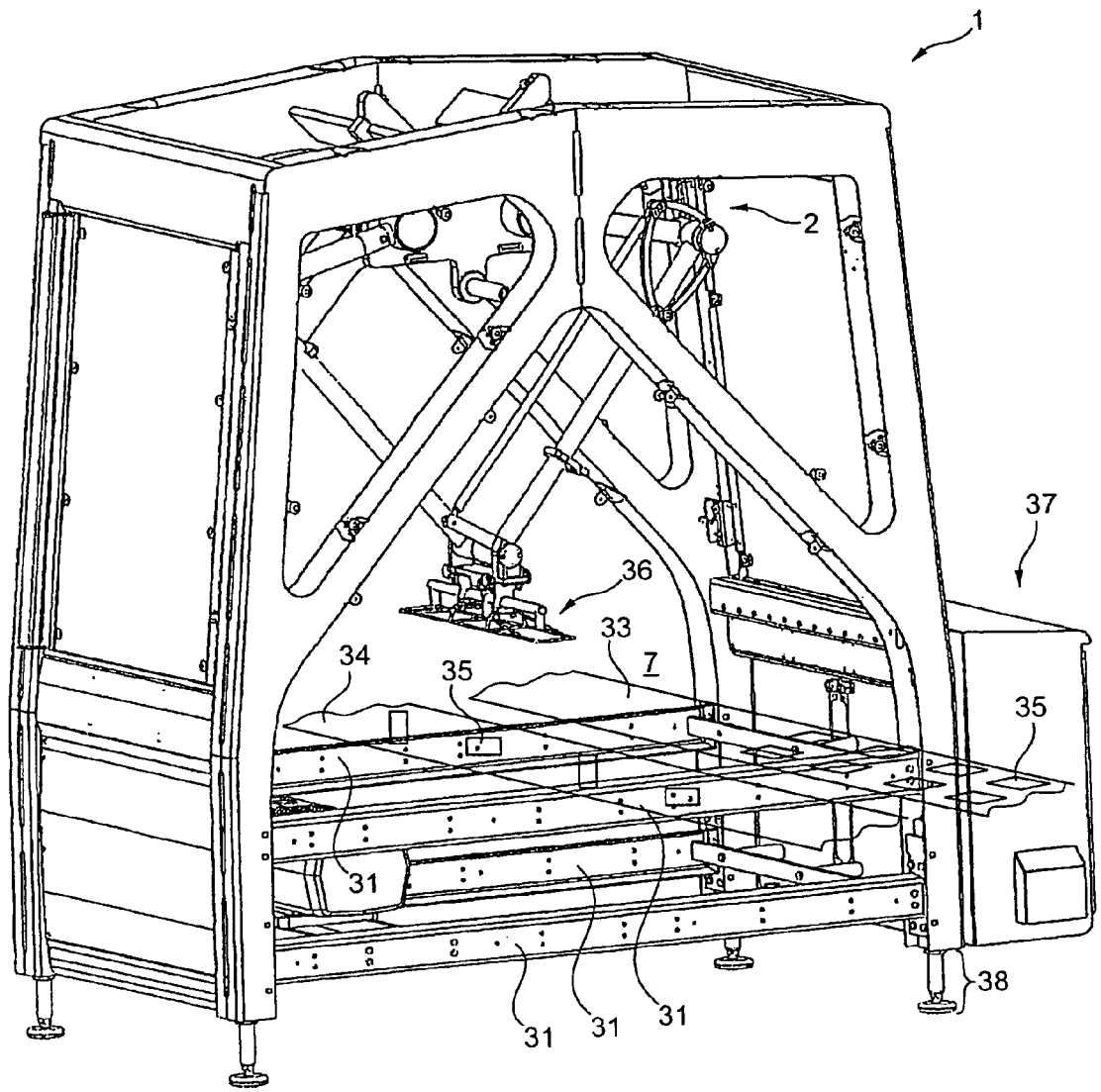
FIG. 4 shows an illustration corresponding to FIG. 2, having further frame elements and a robot fixed to the frame.

The two oblique braces 26, 26' together with the sections, adjoining at the bottom, of the part of the frame profile 3 vertically supporting the support frame form the border of a gantry-like section 7 through which, for example, a conveying device for the products to be handled may pass, as schematically illustrated in FIG. 4.

For accommodating longitudinal braces 31 between the base-like support elements 15, 15', connecting webs and/or connecting bars 8', 8", for example, may be provided on the support elements. This allows a detachable connection between the particular elements, which in particular provides for easier installation and/or maintenance. Alternatively, it is also possible to weld such longitudinal braces with preferably continuous weld seams, thereby minimizing the number of cavities in which contaminants could collect.

Figure 2:
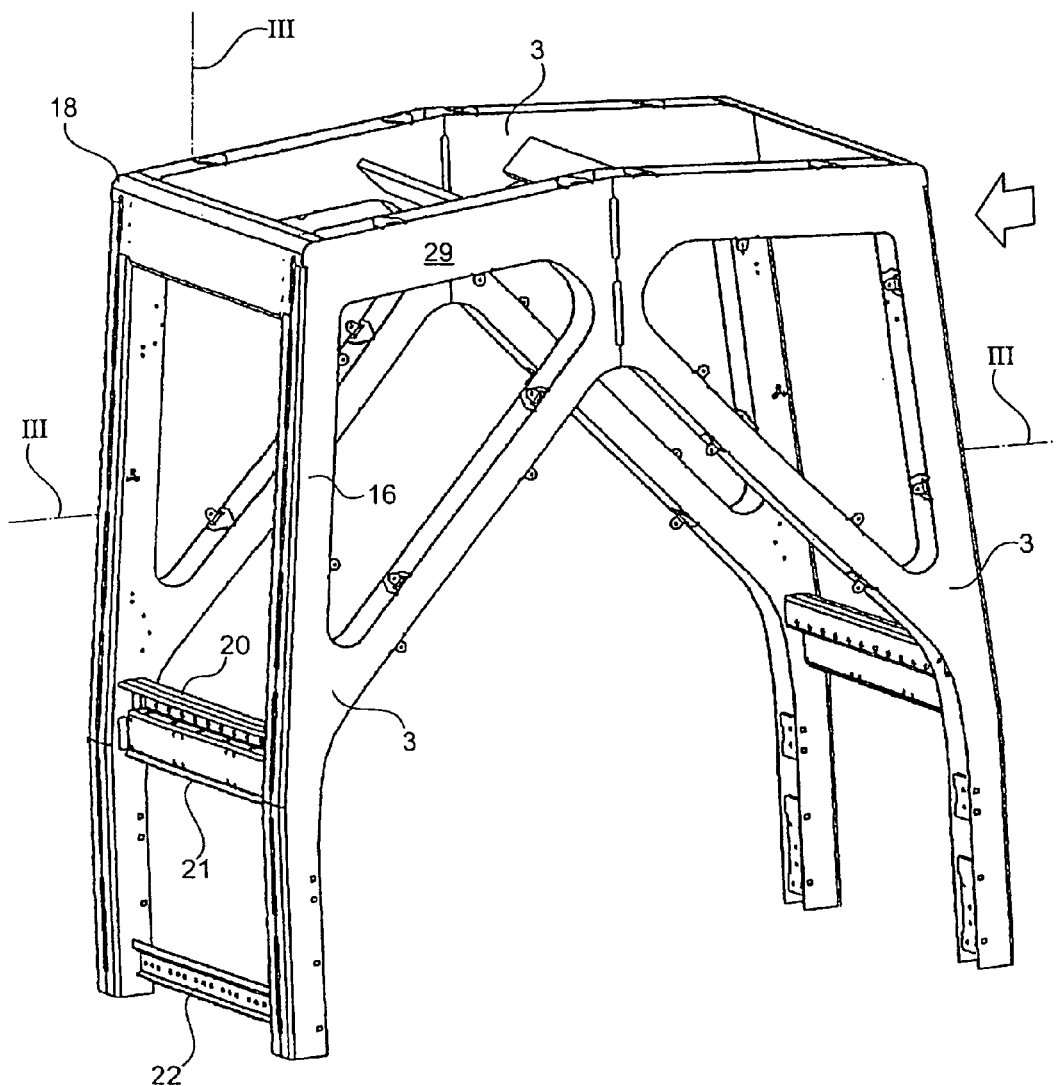

FIG. 2 shows an embodiment, slightly modified from that of FIG. 1, of a support frame for a robot. Firstly, the transverse braces 20 through 22 are situated in the support frame between the two side structures 4, 4', and the outer contours 5, 5' do not have complementary recesses for fixing same to the exterior. In this embodiment the transverse brace 18 still has a rounded transition contour between the head brace 29 and the pillar-like support 16, but compared to FIG. 1 is much more angular.

FIG. 3 shows an enlarged sectional view of elements of the support frame corresponding to lines III and arrow III in FIG. 2. The open design of the frame profile 3 in the form of the two adjacent side elements 5, 5' is shown particularly clearly. The same applies for the mechanical connection thereof via the connecting webs and/or connecting bars 8 and the connecting region, provided essentially without localized raised areas on the surface or edges, between the finger-like connecting elements 12 and the complementary recesses 11 accommodating same. By means of a configuration of connecting webs and/or connecting bars 8 longitudinally provided in alternation on the top and bottom sides, the frame profile thus formed still maintains an essentially open design and therefore meets even the most stringent hygienic requirements.

The same applies for the profile, having a C- or U-shaped cross section, for the base- or pillar-like elements 15, 16, of which the element 16 is illustrated in FIG. 3, having longitudinally extending slots 32. These slots are provided in the connecting web 8 which connects the two side elements 5, 5', and also allow good accessibility from the outside, visual inspection, and cleaning by supplying appropriate media into the interior of the frame profile, which is completely open from the opposite side except for the connecting webs 8 partially situated therein.

FIG. 4 shows a support frame 1 with a robot 2 mounted thereon, and as an example, transport devices 33, 34 led through the gantry-like opening 7. A handling device 36 of the robot 2 is provided for repositioning on the transport device 33 the products 35 to be handled and supplied to the transport device 34. This may be performed, for example, by specifying certain criteria, for example by sorting and/or aligning products 35 which are supplied to the transport device 34, optionally in random orientations, and taken away in an ordered configuration on the transport device 33.

A control cabinet 37 for accommodating appropriate control and/or regulation components as well as for supplying power is also schematically shown, strictly as an example.

For optimal support of the support frame 1 on the floor with level compensation, variable-length feet 38 are provided on the underside of the base-like frame section and optionally anchored to the floor.

Figure 5:
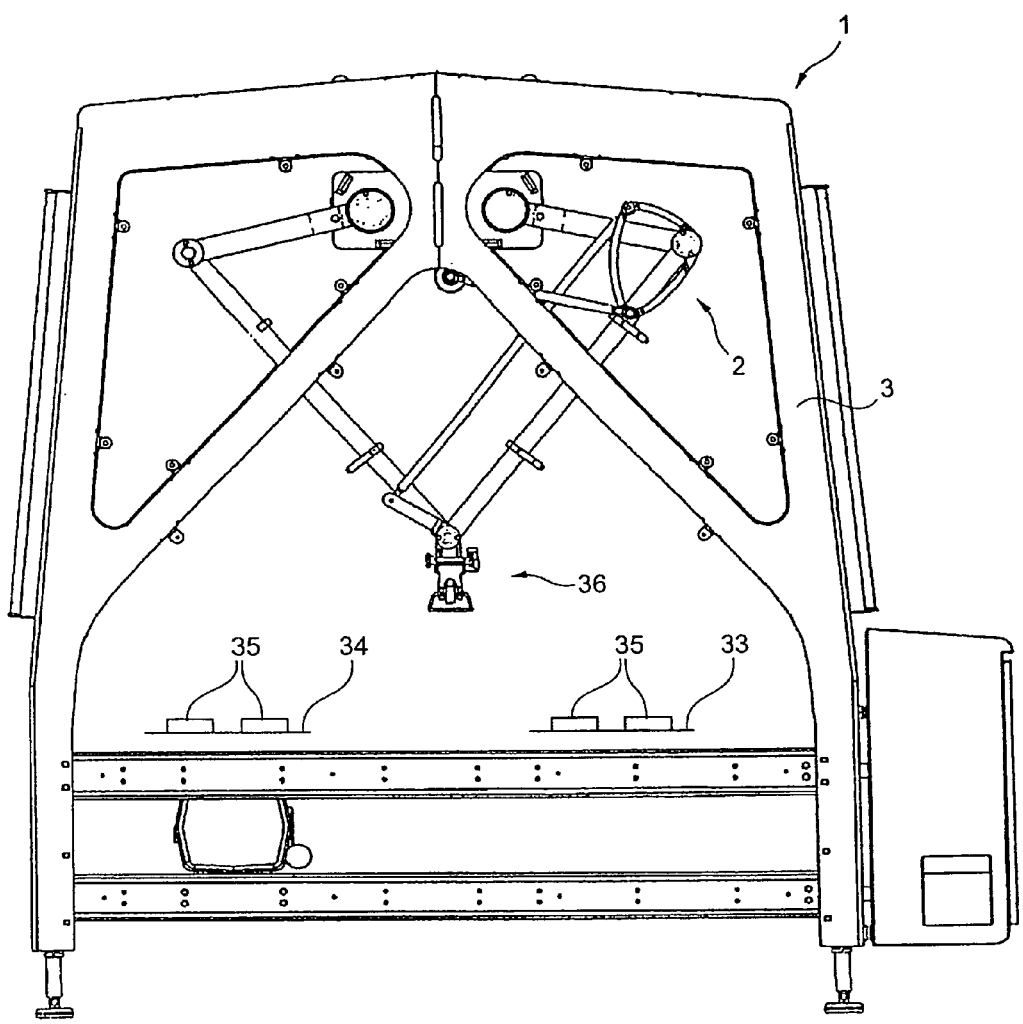
FIG. 5 shows the frame with the robot attached thereto, corresponding to FIG. 4 in a front view.

FIG. 5 schematically shows a front view of the support frame 1 with the robot 2 mounted thereon. Corresponding to the illustration in FIG. 4, schematically shown therein are two transport devices 33, 34 on which products 35 to be handled are repositioned by the handling device 36 of the robot 2.

LIST OF REFERENCE NUMERALS

1 Support frame
2 Robot
3 Frame profile

4 Side structure
5 Side element
6 Opening/cutout
7 Opening/cutout
8 Connecting web and/or clip
9 Edge
10 Surface
11 Recess
12 Projection
13 Fastening element
14 Opening
15 Base
16 Pillar
17 Transverse braces
18 Transverse braces
19 Transverse braces
20 Transverse braces
21 Transverse braces
22 Transverse braces
23 Recess
24 Recess
25 Recess
26 Brace
27 Connection
28 Connection
29 Head brace
30 Opening
31 Longitudinal brace
32 Slot
33 Transport device
34 Transport device
35 Product
36 Handling device
37 Control cabinet
38 Foot

What is claimed is:

1. A support frame and robot combination comprising: a support frame having a substantially open frame profile, the support frame comprising a side structure that includes two side elements that are arranged spaced apart from and adjacent one another at least along sections of the side elements, and at least one connecting bar that joins together the two side elements, wherein the side elements each have at least one recess, and the at least one connecting bar is inserted into the recesses; and a robot attached to the support frame and supported by the support frame; wherein the side structure includes a plurality of the connecting bars, and each side element includes a plurality of the recesses, and wherein each one end of each connecting bar has multiple projections, and each projection is inserted into a recess of one of the side elements.

2. The combination according to claim 1, wherein a fastening element is provided on each of the at least one connecting bar.

3. The combination according to claim 1 further comprising at least one connecting web that joins together the two side elements, wherein each of the at least one connecting web has at least one oblong slot.

4. The combination according to claim 1, wherein the frame profile includes edges or surfaces that are free of localized raised areas.

5. The combination according to claim 1, wherein all flat regions of the frame profile are inclined with respect to a horizontal plane or are vertically oriented.

6. The combination according to claim 1, wherein the side elements have truss-like braces.

7. The combination according to claim 1, wherein at least one of the side elements has a cutout that forms a gantry.

8. The combination according to claim 1, wherein the support frame further includes at least one longitudinal brace provided on at least one side element.

9. The combination according to claim 1, wherein the support frame includes two of the side structures and transverse braces that join together the side structures.

10. The combination according to claim 9, wherein the transverse braces are inclined with respect to a horizontal plane or are vertically oriented.

11. The combination according to claim 9, wherein the side elements include brace recesses and the transverse braces are situated in the brace recesses.

12. The combination according to claim 9, wherein the transverse braces are situated between the side structures.

13. An apparatus comprising: a support frame including: first and second side structures that each include first and second spaced apart side elements, and multiple laterally extending connecting bars that join together the side elements such that each side structure defines a generally open structure, wherein each side element includes multiple recesses, and each connecting bar includes multiple projections that extend into the recesses such that the side structures are free of localized raised areas; and multiple transverse braces that connect the side structures together; wherein each side structure defines an opening; a conveying system that extends through the openings in the side structures; and a robot attached to the support frame and supported by the support frame, the robot including a handling device for positioning products on the conveying system.

14. The combination of claim 1 wherein the side structure includes a plurality of the connecting bars, and each side element includes a plurality of the recesses, and wherein each connecting bar is inserted into at least one of the recesses of each side element.

15. The combination of claim 14 wherein the connecting bars include at least two vertically spaced apart connecting bars.

16. The combination of claim 14 wherein each connecting bar includes a body portion positioned between the side elements, and multiple non-threaded projections formed integrally with the body portion, wherein each projection is inserted into a recess of one of the side elements.

17. The apparatus of claim 13 wherein the connecting bars include multiple vertically spaced apart connecting bars.

18. The combination of claim 1 wherein each side element has a vertically oriented flat design, and the side elements are spaced apart horizontally.

19. The apparatus of claim 13 wherein each projection is non-threaded.

20. The apparatus of claim 13 wherein each side element has a vertically oriented flat design, and the side elements of each side structure are spaced apart horizontally.

* * * * *